Nov. 3, 1964 P. GANCEL 3,155,194
DISC BRAKES
Filed Dec. 27, 1961 4 Sheets-Sheet 3

Nov. 3, 1964

P. GANCEL 3,155,194

DISC BRAKES

Filed Dec. 27, 1961

United States Patent Office 3,155,194
Patented Nov. 3, 1964

3,155,194
DISC BRAKES
Pierre Gancel, Paris, France, assignor to Société
Anonyme D.B.A., Paris, France, a company of
France
Filed Dec. 27, 1961, Ser. No. 162,377
Claims priority, application France Jan. 2, 1961
10 Claims. (Cl. 188—73)

The invention relates to disc brakes and, more particularly, to a brake which is simple in construction and of reduced size while at the same time efficient in its function.

An object of the invention is the provision of a disc brake in which the disc is advantageously driven at its outer periphery, the brake being equipped with a housing which is slidable on a fixed axis parallel to the axis of the disc and which comprises a cylinder provided with a piston which acts on a friction pad and which brings the latter into engagement with one of the disc faces, and a pressure member arranged to apply a second friction pad against the opposite face of the disc when the cylinder is put into operation.

According to a characteristic of the invention, the housing is connected to a fixed support by means of a single attaching means adapted to permit angular movement of the housing both parallel and perpendicular to the disc faces, as well as axial movement of the housing.

According to another characteristic of the invention, the housing is movable on a shaft, the opposite ends of which are fixed to two plates arranged on opposite sides of the disc and forming part of the fixed support. The brake is arranged such that the friction pads transmit the braking force directly to the fixed support when braking in a forward direction. To this end, the fixed support is provided with an inclined abutment surface which engages a complementary end portion of each of the pads. When braking in a rearward direction, the braking force is transmitted from the pads to the fixed support through the housing, the latter being equipped with a block of elastic material which absorbs this action by its compression.

According to another characteristic of the invention, the two members forming part of the fixed support are welded one to the other at their external portions located beyond the non-driven periphery of the disc, and form a V-shaped recess into which the adjacent end of the pad, which is the leading end during forward braking, is engaged. The association of this V-shaped recess and of the block of elastic material provides an assembly without play, the abutment of the pad in the V-shaped recess causing pressure to be applied by the housing on the block of elastic material. The latter is thus brought under compression, and its elasticity securely maintains the pad against the upper surface of the V-shaped recess.

Another characteristic of the invention, intended for rigidly interconnecting the pads and the piston, lies in the utilization of bosses projecting into recesses, the length of projection being at most equal to that of an elastic guard which is arranged between the piston and the bottom of the cylinder.

In addition, the invention provides automatic adjusting means adapted to be incorporated in the hand brake control and comprises a screw provided with a low pitch thread having inclined sides which is in threaded engagement with a sleeve mounted on the housing and provided with axial slots. When this screw is brought into rotation by the control lever, it effects a radial expansion of the sleeve which action locks the sleeve on its support. The sleeve is threaded on its outer surface and screwed into a bore formed in the housing and is provided with a ratchet wheel which cooperates with a pawl connected to the screw so that when the clearance between the linings and the disc exceeds a predetermined value, the screw rotates the sleeve with respect to its support to reestablish the initial clearance.

Other characteristics and advantages of the invention will appear in the following description and in the accompanying drawings, in which.

Figure 1:
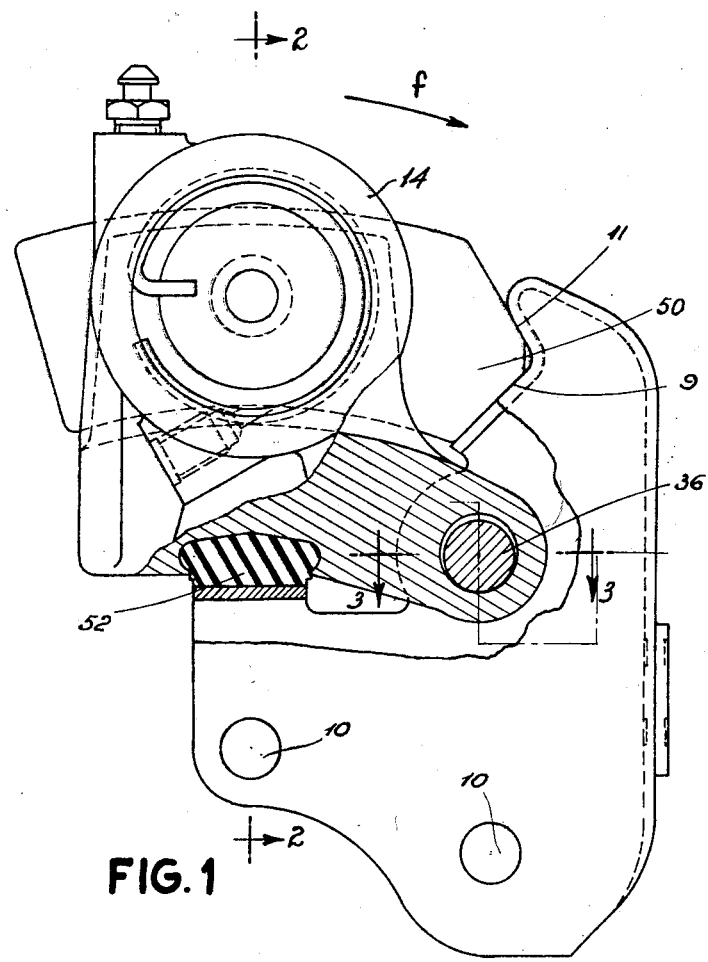
FIG. 1 is an elevated view partly in cross section of a disc brake made in accordance with the present invention.
Figure 2:
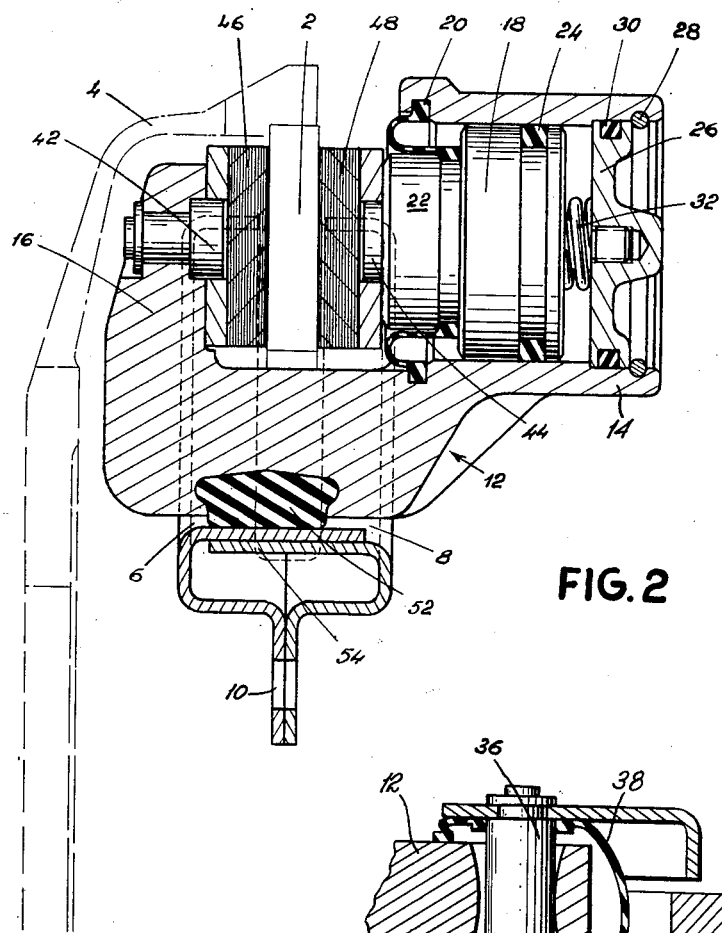
FIG. 2 is a view in cross section taken along line 2—2 of FIG. 1 and showing the housing comprising a cylinder arranged to one side of the disc and a pressure plate arranged to the other side of the disc.
Figure 3:
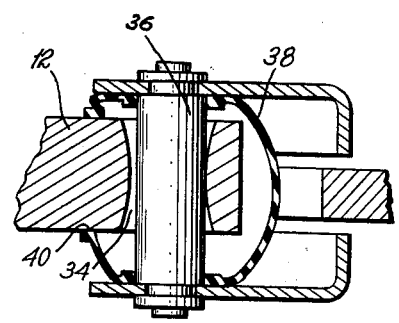
FIG. 3 is a partial view, in cross section taken along line 3—3 of FIG. 1 and showing the arrangement of the housing on an axle which is carried by two plates forming part of the fixed support.

The brake shown in the drawings comprises a rotatable disc 2 driven at its outside periphery by connection to a bell 4, drawn in outline in FIG. 2, which also restrains the disc from motion in the axial direction. The fixed support of the brake comprises two plates 6 and 8 connected to a fixed member of the vehicle, such as the axle spindle, by means of bolts which are not shown, and which pass through aligned holes 10 arranged in said plates near the disc axis. The plates 6 and 8 may be connected one to the other by welding and form abutment surfaces 9 and 11 to which reference will be made hereinafter.

The control mechanism comprises a housing designated in general by the reference numeral 12. The housing comprises a cylinder 14, arranged on one side of the disc and a pressure plate 16 arranged on the opposite side of the disc.

A piston 18 equipped with a sealing boot 20 is mounted in the cylinder. The respective ends of the boot are attached on the one hand to the cylinder and, on the other hand, to a head 22 of reduced diameter which is provided on the working end of the piston. The periphery of the piston is provided with a groove in which a resilient sealing ring 24 is arranged. The elasticity of this ring may also be used to aid the return of the piston when the hydraulic pressure ceases to act upon the latter.

The bottom of the cylinder 14 comprises a closure member 26 locked by a stop ring 28. A sealing ring 30 is interposed between the periphery of the closure member and the wall of the cylinder. An automatic adjusting device, which might be of the type described in French patent application No. 828,069, filed on May 24, 1960, in the name of the company, The Bendix Corporation, and corresponding to U.S. application Serial No. 58,600, filed on September 22, 1960, now U.S. Patent No. 3,122,-222, is interposed between the piston and the bottom of the cylinder. This device comprises a spring 32, the purpose of which is to permit, by compressing, a temporary retraction of the piston in case of deflection of the disc and then to return the piston back to its normal position.

The housing 12 is provided with a bearing bore 34 through which passes a shaft 36 having a diameter less than that of the smallest portion of the bearing bore, the opposite ends of the shaft being fixed to the two plates 6 and 8 once the mounting of the housing is effected. The housing 12 is thus adapted to slide and rotate on the shaft and the inner surface of the bearing bore 34 is convex so that it gives to the housing a freedom of movement which permits the latter to adjust its position angularly to that of the disc in the event of misalignment of the disc or deflection of the latter.

It should be observed that the inner surface of the bearing bore 34 is not machined after casting and actually establishes a broad contact between the housing 12 and the shaft 36 which facilitates the sliding of the housing. It should also be noted that the shaft 36 braces the plates 6 and 8, which reinforces the rigidity of the fixed support. An envelope 38 made of plastic material surrounds the shaft 36 and forms a sealed enclosure which is filled with grease to facilitate the sliding of the housing 12 on the axle 36. This envelope has an opening 40 through which extends the adjacent portion of the housing.

The pressure plate 16 and the piston 18 are provided with bosses 42, 44, respectively, which are fitted into sockets in the pads 46, 48 arranged on opposite sides of the disc. The pads are thus rigidly joined to the housing 12. The maximum length of the bosses is equal to the clearance provided between the piston 18 and the bottom of the cylinder 14. The abutment surfaces 9 and 11 provided on the fixed support form a V-shaped recess against which the corresponding shaped ends 50 of the pads anchor in the forward braking direction indicated by the arrow "f."

To insert the pads, it is only necessary to displace the housing 12 with respect to the disc 2. This may be done by pushing the piston 18 inwardly against the action of the spring 32, by an amount sufficient to permit the pads to be inserted and the bosses 42, 44 to be fitted into the sockets provided in the pads. The ends 50 of the pads should be place in the V-shaped recesses provided on the fixed support and the housing pushed by angular rotation about the shaft 36 against a block 52 of elastomeric material carried by joined elements 54 of the fixed support. The block 52 is thus compressed between the housing and the fixed support.

In forward braking, the admission of a fluid under pressure into the cylinder 14, causes the displacement of the piston 18 which applies the pad 48 against the adjacent surface of the disc 2. The action of the fluid under pressure on the bottom of the cylinder also causes the housing 12 to slide along the shaft 36 and applies the pad 46 against the opposite face of the disc by means of pressure plate 16.

In rearward breaking, that is, in the direction opposite to the arrow "f," the braking effort exerted on the friction pads, which are connected to the housing by the bosses 42, 44, is transmitted to the fixed support through the housing which rotates about the shaft 36, the shock of this transmission being absorbed by the block 52 of elastic material.

Figure 4:
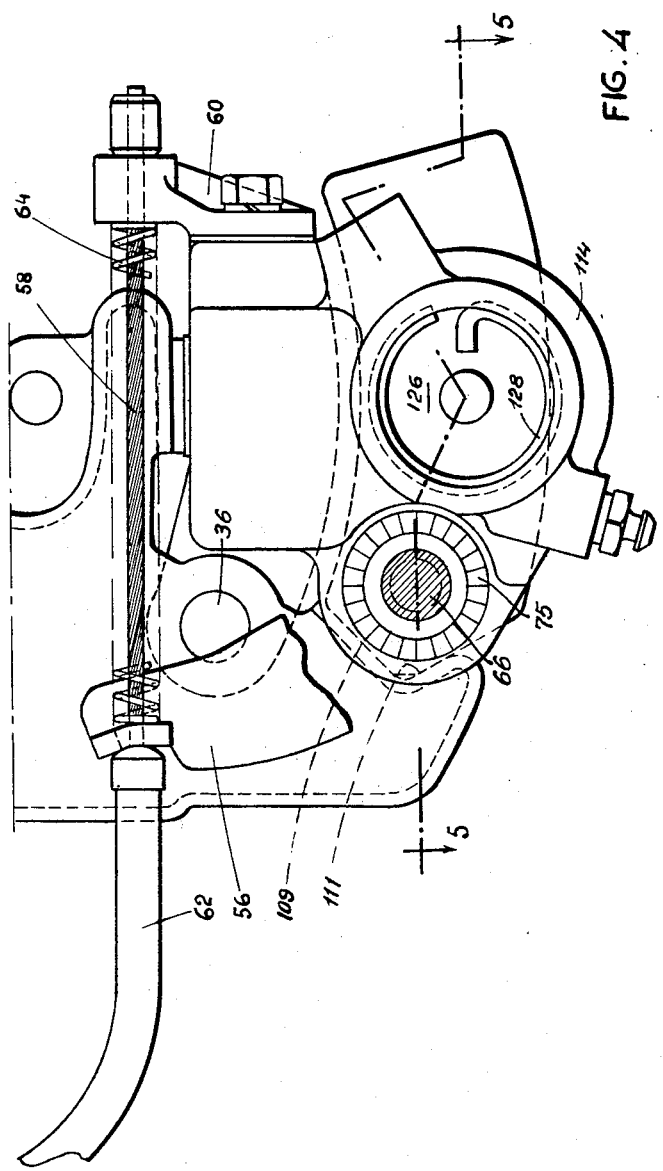
FIG. 4 is a view similar to FIG. 1 and shows another embodiment of the invention equipped with a hand-operated control.
Figure 8:
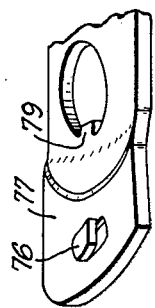
FIG. 8 is a view of a washer illustrated in FIGS. 5 and 7.
Figure 5:
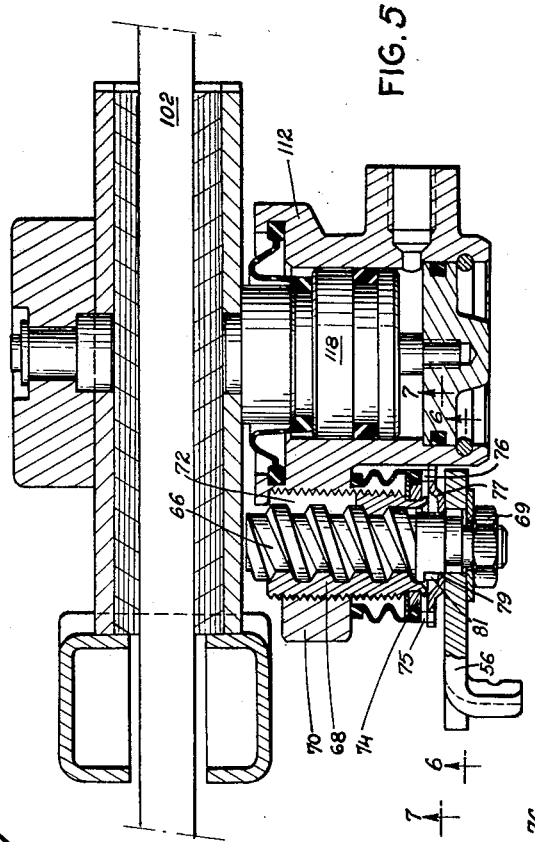
FIG. 5 is a view in cross section taken along line 5—5 of FIG. 4 and showing the construction of the automatic adjusting device incorporated in the hand control.
Figure 6:
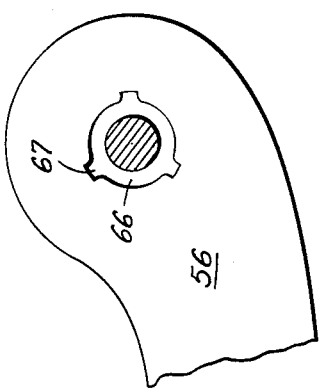
FIG. 6 is a view taken along section line 6—6 of FIG. 5.
Figure 7:
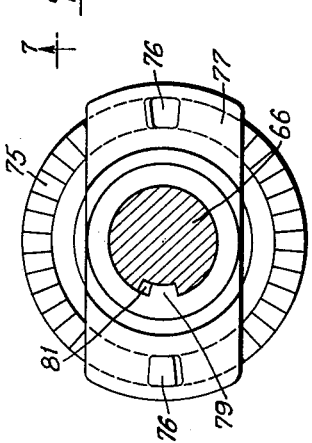
FIG. 7 is a view taken along section line 7—7 of FIG. 5.

The embodiment shown in FIGS. 4 and 5 is similar to that previously described, the elements having a function identical to those described above being designated in these FIGURES by the same reference numerals increased by 100.

The disc brake shown in FIGS. 4 and 5 comprises a hand control including a lever 56 actuated by a cable-sheath assembly. The cable 58 is hooked to a bracket 60 attached to the housing. The sheath 62 abuts on the lever 56 and a spring 64 interposed between the bracket 60 and the lever 56 maintains the latter in its normal position. The lever 56 is splined to the end portion of screw 66, which comprises three angularly spaced ribs 67 received in complementary slots of the lever and is attached thereto by means of a nut 69. The screw 66 is in threaded engagement with a sleeve 68 which has a plurality of axial slots 72. The sleeve 68 is threaded on its outer surface and is screwed into a bore formed on an embodiment 70 of the housing 112. A wheel 74 having ratchet teeth 75 formed on its outer face is attached by suitable means, as by means of a bent flange, to the sleeve 68. The ratchet teeth 75 cooperate with two diametrically opposed pawls 76 formed on a resilient washer 77 mounted on the end portion of the screw 66 and having a lost motion connection therewith. This lost motion connection is provided by a tab 79 formed on the washer 77 and received in a longitudinal groove 81 formed in the screw 66 and having a larger circumferential extent than the tab. The pawls 76 are struck from the washer 77 and are resiliently biased against the ratchet teeth of the wheel 74 by the resiliency of the washer. A clearance is provided between the radially outer portion of the washer 77 and the adjacent surface of the lever 56 to allow the pawls to climb over the ratchet teeth.

Because of the lost motion connection between the screw 66 and the washer 77, the latter is driven in rotation by the screw only after the lever 56 and the screw 66 have rotated over an angle equal to the angular clearance between the washer and screw which corresponds to the normal clearance of the brake.

Let us assume that pawls 76 have picked up a new tooth upon rotation of the screw and lever in excess of the angular clearance corresponding to the lost motion connection. When the brake lever is released the lever and screw will rotate over said angular clearance before the washer 77 is driven thereby. Thereafter the washer 77 and in turn the sleeve 68 are rotated by the screw 66, and the assembly lever 56, screw 66 and sleeve 68 are moved towards the friction pad. With the described construction the screw 66 is always moved away from the friction pad a predetermined distance before adjustment occurs. Upon release of the brake the sleeve 68 is allowed to rotate closer to the disc in order to reestablish the initial clearance between the linings and disc since the screw 66 is no longer loaded by the reactive force of the pad.

It is to be understood that the above described arrangements are simply illustrative of the application of the principles of the invention. Numerous other arrangements may be devised by those skilled in the art which will embody the principles of the invention and fall within the scope thereof.

What is claimed is:

1. A disk brake comprising: a rotor having opposed friction surfaces thereon, a fixed support member comprising a base portion and an arm extending outwardly therefrom straddling said rotor, a housing member straddling said rotor, means operatively connecting said housing to said support member for slidable movement in a direction transverse to the plane of said friction surfaces and for rocking movement in a plane generally parallel to said friction surfaces, first and second friction members each having laterally spaced ends, said first friction member being slidable with respect to said support member and having one end engaging said arm, said second friction member being carried by said housing and having one end engaging said arm, said friction members being located opposite a respective one of said friction surfaces, actuating means carried by said housing to engage said first friction member with its respective surface and through reaction move said housing and thereby said second friction member into engagement with its respective surface, coacting anchoring surfaces located on said housing and said support member situated at a location which is in a lateral direction away from said one end of said friction members and towards the other end of said friction members and remote from said one end of said friction members and said arm, said connecting means being located relative to said anchoring surfaces, said one end of said friction members, and said arm that upon braking during rotation of said rotor in one direction, said anchoring surface located on said housing will be moved in a direction away from the anchoring surface on said support member and said one end of said friction members will be moved into anchoring engagement with said arm and upon braking during rotation of said rotor in the opposite direction, said anchoring surface on said housing will be moved into anchoring engagement with said anchoring surface on said support member and said one end of said friction members will be moved in a direction away from said arm, whereby the force exerted on said friction members by said rotor during rotation in said one direction will be transmitted directly by said friction members to said arm and the force exerted on said friction members by said rotor during rotation in said other direction will be transmitted through said housing to said support member.

2. The structure as recited in claim 1 wherein said coacting anchoring surface on said support member is located on said base portion.

3. A disk brake comprising: a rotor having opposed friction surfaces thereon, a fixed support member comprising a base portion and an arm extending outwardly therefrom straddling said rotor, a housing member straddling said rotor, means operatively connecting said housing to said support member for slidable movement in a direction transverse to the plane of said friction surfaces and for rocking movement in a plane generally parallel to said friction surfaces, first and second friction members each having laterally spaced ends, said first friction member having slidable with respect to said support member and having one end engaging said arm, said second friction member being carried by said housing and having one end engaging said arm, said friction members being located opposite a respective one of said friction surfaces, actuating means carried by said housing to engage said first friction member with its respective surface and through reaction move said housing and thereby said second friction member into engagement with its respective surface, said housing and said base portion having coacting anchoring surfaces which are circumferentially located between said lateral ends of said friction members and radially located between the axis of rotation of said rotor and said friction members, said connecting means being located relative to said anchoring surfaces, said one end of said friction members, and said arm that upon braking during rotation of said rotor in one direction, said anchoring surface located on said housing will be moved in a direction away from the anchoring surface on said support member and said one end of said friction members will be moved into anchoring engagement with said arm and upon braking during rotation of said rotor in the opposite direction, said anchoring surface on said housing will be moved into anchoring engagement with said anchoring surface on said support member and said one end of said friction members will be moved in a direction away from said arm, said one direction will be transmitted directly by said friction members to said arm and the force exerted on said friction members by said rotor during rotation in the said other direction will be transmitted through said housing to said base portion.

4. The structure as recited in claim 3 wherein said friction surfaces are secured to said rotor at the outer periphery thereof and said housing straddles the inner periphery of said friction surfaces.

5. The structure as recited in claim 4 wherein said base portion of said support member extends across the inner periphery of said friction surfaces.

6. The structure as recited in claim 5 where said anchoring surfaces are located on the portion of said base portion and said housing which extend across the inner periphery of said friction surfaces.

7. The structure as recited in claim 6 wherein said connecting means comprises an elongated opening located in said housing the axis of which extends transverse to said friction surfaces, and a shaft connected to said support member and slidably received in said opening.

8. The structure as recited in claim 7 wherein the wall of said opening is convexly shaped in its axial direction whereby said housing can also rock about an axis generally parallel to the plane of said friction surfaces.

9. The structure as recited in claim 6 wherein said coacting anchoring surfaces include a resilient member.

10. The structure as recited in claim 9 wherein said arm has a generally V-shaped recess on each side of said rotor receiving said one end of a respective friction member, said one end of each of said friction members being wedge-shaped, said resilient member being normally in compression to maintain said wedge-shaped ends in firm engagement with said arm.

References Cited in the file of this patent

UNITED STATES PATENTS

| | | |
|---|---|---|
| 2,733,781 | Brisson | Feb. 7, 1956 |
| 2,784,811 | Butler | Mar. 12, 1957 |
| 2,820,530 | Chouings et al. | Jan. 21, 1958 |
| 2,968,370 | Ruet | Jan. 17, 1961 |
| 2,981,381 | Swift | Apr. 25, 1961 |
| 3,047,098 | Olley | July 31, 1962 |
| 3,081,843 | Dotto et al. | Mar. 19, 1963 |

FOREIGN PATENTS

| | | |
|---|---|---|
| 1,227,386 | France | Mar. 7, 1960 |

UNITED STATES PATENT OFFICE
CERTIFICATE OF CORRECTION

Patent No. 3,155,194                          November 3, 1964

Pierre Gancel

It is hereby certified that error appears in the above numbered patent requiring correction and that the said Letters Patent should read as corrected below.

Column 3, line 51, for "breaking" read -- braking --; column 5, line 28, for "having" read -- being --; column 6, line 4, after "arm," insert -- whereby the force exerted on said friction members by said rotor during rotation in --.

Signed and sealed this 6th day of April 1965.

(SEAL)
Attest:

ERNEST W. SWIDER
Attesting Officer

EDWARD J. BRENNER
Commissioner of Patents